A. & G. H. KING.

Washing Machine.

No. 3,736. Reissued Nov. 16, 1869.

United States Patent Office.

ALEXANDER KING AND GEORGE H. KING, OF PAINESVILLE, OHIO.

*Letters Patent No.* 94,005, *dated August* 24, 1869; *reissue No.* 3,736, *dated November* 16, 1869.

IMPROVEMENT IN WASHING-MACHINES.

The Schedule referred to in these Letters Patent and making part of the same.

*To all whom it may concern:*

Be it known that we, ALEXANDER KING and GEORGE H. KING, of Painesville, in the county of Lake, and State of Ohio, did invent a new and improved Washing-Machine; and we do hereby declare that the following is a full, clear, and exact description thereof, reference being had to the accompanying drawings, forming part of this specification, in which—

Similar letters of reference indicate corresponding parts.

Our invention has for its object to furnish an improved washing-machine, which shall be simple in construction and effective in operation, doing its work quickly and thoroughly; and It consists in the construction and combination of the various parts, as hereinafter more fully described.

A is the body of the washing-machine, which is made cylindrical in its general form.

The body A may be made slightly tapering, if desired, and to the inner surface of its sides is attached a number of upright ribs B, extending from the bottom to, or nearly to the top of said body.

The ribs B should be rounded off upon their inner edges, to prevent them from wearing the clothes.

C is a shaft or spindle, passing down vertically through the centre of the bottom of the body A, and to its upper end is attached a circular plate, D, in such a way as to be carried around by the revolution of the said shaft C.

To the upper side of the circular plate D is attached a number of radial ribs or flanges, E, the upper edges of which should be rounded off to prevent them from wearing the clothes.

The lower end of the vertical shaft C revolves in a step in the lower or horizontal part of the bracket F, attached to the lower side of the bottom of the body or tub A.

To the lower end of the vertical shaft C is attached a bevel-gear wheel, G, into the teeth of which mesh the teeth of the bevel-gear wheel H, attached to the inner end of the horizontal shaft I.

The inner part of the horizontal shaft I revolves in bearings in one arm of the bracket F, and its outer part revolves in bearings in the arm or bracket J, attached to the lower part of the side of the body A.

To the outer end of the horizontal shaft I is attached a crank or crank-wheel, K, to the crank-pin of which is pivoted the lower end of the connecting-bar L, the upper end of which is pivoted to the crank-pin of the crank or crank-wheel M, pivoted to the upper part of the body A, or to a bar or bracket, N, attached to the said body.

To the crank-pin of the crank or crank-wheel M is attached the hand-crank O, by means of which the machine is operated.

Figure 1:
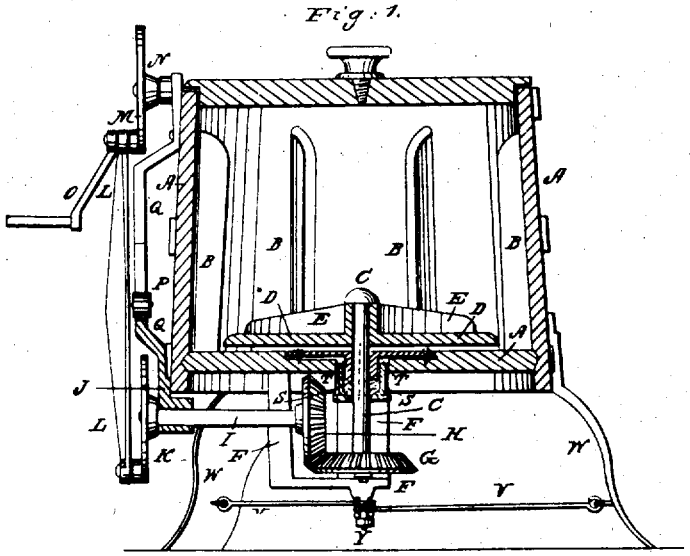
Figure 1 is a vertical section of an improved machine, taken through the line *x x*, fig. 2.
Figure 2:
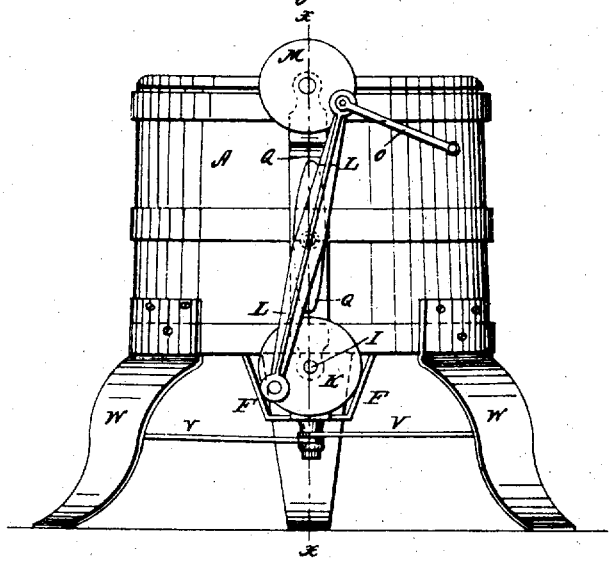
Figure 2 is a side view of the same.

To the centre of the connecting-bar L is attached an inwardly-projecting pin, P, which passes through a slot in the vertical bar Q, the ends of which are bent inward, and are attached to the side of the body A, so that the middle or slotted part of said bar may stand out a little from the said body A, as shown in fig. 1.

The slot in the bar Q should be made wider in its middle part, to give the necessary freedom of movement to the bar L, and at the same time enable it to properly control the movement of the cranks or crank-wheels K and M.

T and S are short tubes, fitting into each other, and to the outer end of the outer tube S, and to the inner end of the inner tube T, are attached, or upon them are formed plates, which overlap the outer and inner sides of the bottom of the body A.

The tubes S T are packed with suitable packing, to make them serve as a stuffing-box, to prevent the escape of the water.

The tubes S T are pressed together, compressing the packing, and at the same time securing the said tubes in place by bolts and nuts, said bolts passing through the bottom of the body A A, and through the plates attached to the said tubes S T.

V V are stay-rods or braces, passing from the central bolt or step X to each leg W of the washing-machine to stiffen the legs.

Having thus described our improvements,

What we claim, and desire to secure by Letters Patent, is—

1. The revolving disk D D, located near the bottom of the tub, and supported at the upper end of a vertical shaft which passes through the bottom of the tub.

2. The revolving disk, vertical shaft passing through the bottom of the tub and the stuffing-box, as shown.

3. The arrangement of the support for the step of the vertical shaft on brackets attached to the bottom of the tub, as shown.

4. The stay-rods or braces V, passing from the central bolt or step to each leg of the washing-machine for stiffening the legs.

5. The arrangement of the revolving disk D D, located at the bottom of the tub, and supported on a vertical shaft which passes through the bottom of the tub, and the direct vertical driving-shaft, and bevelled-gearing G H, arranged below the tub.

6. The arrangement of the crank-wheels M K, the crank O, the connecting-bar L, the pin P, and slotted bar Q, as described and shown.

ALEX. KING.
GEO. H. KING.

Witnesses:
GEORGE E. BUCKLEY,
W. A. A. MCKINLEY,
J. T. TINKER,
HORACE ALVORD.